United States Patent

Sekiya

(10) Patent No.: US 7,440,373 B2
(45) Date of Patent: Oct. 21, 2008

(54) OPTICAL DISK DRIVE DETECTING DISK SURFACE DEVIATION

(75) Inventor: Harutaka Sekiya, Tsurumi-ku (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 551 days.

(21) Appl. No.: 10/771,503

(22) Filed: Feb. 5, 2004

(65) Prior Publication Data

US 2004/0218496 A1 Nov. 4, 2004

(30) Foreign Application Priority Data

Feb. 5, 2003 (JP) ............................. 2003-028487

(51) Int. Cl.
*G11B 7/00* (2006.01)
(52) U.S. Cl. ............... 369/53.14; 369/53.15; 369/44.32
(58) Field of Classification Search ............. 369/53.14, 369/53.15, 44.32, 53.11, 53.12, 53.13, 53.23, 369/53.22, 53.42
See application file for complete search history.

(56) References Cited

U.S. PATENT DOCUMENTS

| 4,764,914 A | * | 8/1988 | Estes et al. ............... 369/53.14 |
|---|---|---|---|
| 5,036,507 A | * | 7/1991 | Yamashita ............... 369/44.32 |
| 5,502,698 A | * | 3/1996 | Mochizuki ............... 369/44.32 |
| 6,266,304 B1 | * | 7/2001 | Nagano et al. ........... 369/44.32 |
| 6,370,094 B1 | * | 4/2002 | Kishinami et al. ....... 369/44.32 |
| 6,400,663 B1 | * | 6/2002 | Okada et al. ............. 369/44.29 |
| 6,407,968 B1 | * | 6/2002 | Nakata et al. ............ 369/44.26 |
| 2003/0147314 A1 | * | 8/2003 | Kondo et al. ............ 369/44.32 |
| 2003/0174599 A1 | * | 9/2003 | Aman et al. ............. 369/44.32 |

FOREIGN PATENT DOCUMENTS

JP         10-188464         7/1998

* cited by examiner

*Primary Examiner*—Wayne Young
*Assistant Examiner*—Thomas D Alunkal
(74) *Attorney, Agent, or Firm*—Staas & Halsey LLP

(57) ABSTRACT

An optical disk drive capable of detecting a surface deviation of a disk during a very short period includes an analog-to-digital converter (ADC) converting a focus error signal output from a pickup into digital data, and a central processing unit (CPU) writing an output of the ADC to a memory during one rotation of a motor according to a timing of a pulse signal output from a spindle motor. After that, the CPU reads data written to the memory and obtains a sine curve that minimizes the sum of squares of errors among data by a least square method. The CPU obtains a peak-to-peak value of the obtained sine curve and compares the peak-to-peak value to a predetermined threshold value, thereby determining the existence of the surface deviation of the disk.

8 Claims, 4 Drawing Sheets

OPTICAL DISK DRIVE DETECTING DISK SURFACE DEVIATION

CROSS-REFERENCE TO RELATED APPLICATIONS

This application claims the benefit of Japanese Patent Application No. 2003-28487, filed on Feb. 5, 2003, in the Japanese Intellectual Property Office, the disclosure of which is incorporated herein by reference.

BACKGROUND OF THE INVENTION

1. Field of the Invention

The present invention relates to an optical disk drive that reads data from and writes data to an optical disk.

2. Description of the Related Art

When data is read from or written to an optical disk having a surface deviation, i.e., a slightly inclined disk surface, the number of disk revolutions should be lower than in the case of a normal disk (see Patent document 1).

[Patent document 1]

Japanese Patent No. Hei 10-188464

A surface deviation of a disk is detected by monitoring a focus actuator signal or a focus servo signal. However, since the focus actuator signal and the focus servo signal are corrupted by noise, the focus actuator or focus servo signals should be repeatedly measured and averaged. Additionally, when the surface deviation is large, detection thereof should be performed after a seek operation is terminated. As a result, it takes much time to detect the surface deviation after the disk is loaded into a drive.

SUMMARY OF THE INVENTION

The present invention provides an optical disk drive capable of detecting surface deviation of a disk in a very short period.

According to one aspect of the present invention, there is provided an optical disk drive that writes data to or reads data from a rotating optical disk using an optical pickup. The optical disk drive comprises an analog-to-digital converter (ADC), a sampler, a calculator, and a detector. The ADC converts a focus error signal output from the optical pickup into digital data. The sampler writes an output of the analog-to-digital converter to a memory at a predetermined interval during one rotation of the optical disk. The calculator reads data written to the memory and obtains a sine curve that minimizes the sum of squares of errors among the read data by a least square method. The detector obtains a peak-to-peak value of the sine curve obtained by the calculator and determines if a surface deviation of the optical disk exists by comparing the obtained peak-to-peak value to a predetermined threshold value.

According to another aspect of the present invention, there is provided an optical disk drive including a pickup that writes data to or reads data from a rotating optical disk, a filter that amplifies frequency components of an output of the pickup at different amplification rates according to frequencies, and an amplifier that amplifies an output of the filter and outputs the amplified output to an actuator of the pickup. The optical disk drive comprises an analog-to-digital converter (ADC), a sampler, a calculator, and a detector. The ADC converts a focus error signal output from the pickup into digital data. The sampler lowers a low passband amplification rate of the filter and writes an output of the analog-to-digital converter to a memory at a predetermined interval during one rotation of the optical disk. The calculator reads data written to the memory and obtains a sine curve that minimizes the sum of squares of errors among the read data by a least square method. The detector obtains a peak-to-peak value of the sine curve obtained by the calculator and determines the existence of a surface deviation of the optical disk by comparing the obtained peak-to-peak value to a predetermined threshold value.

A focus actuator signal may be used instead of the focus error signal.

The sampler receives the output of the analog-to-digital converter according to a timing of a pulse signal that is output from a motor that rotates the optical disk each time the motor rotates by a predetermined angle.

According to another aspect of the present invention, there is provided a method of detecting disk surface deviation, including inputting a pulse signal once per every rotation of a disk, sampling a focus error signal and outputting sampling data, generating an interrupt at a rising edge and a falling edge of the pulse signal, terminating the interrupt if determined that the disk has rotated once, obtaining a sine curve by using the output sampling data according to a least square method, obtaining a peak-to-peak value of the sine curve, and determining whether the disk surface deviation exists by comparing the peak-to-peak value to a predetermined threshold value.

According to another aspect of the present invention, there is provided a method of detecting disk surface deviation including sampling a focus error signal and generating sampling data, obtaining a sine curve using the sampling data according to a least square method, obtaining a peak-to-peak value of the sine curve, and determining whether the disk surface deviation exists by comparing the peak-to-peak value to a predetermined threshold value.

According to another aspect of the present invention, there is provided a computer readable medium encoded with processing instructions for implementing the above methods.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
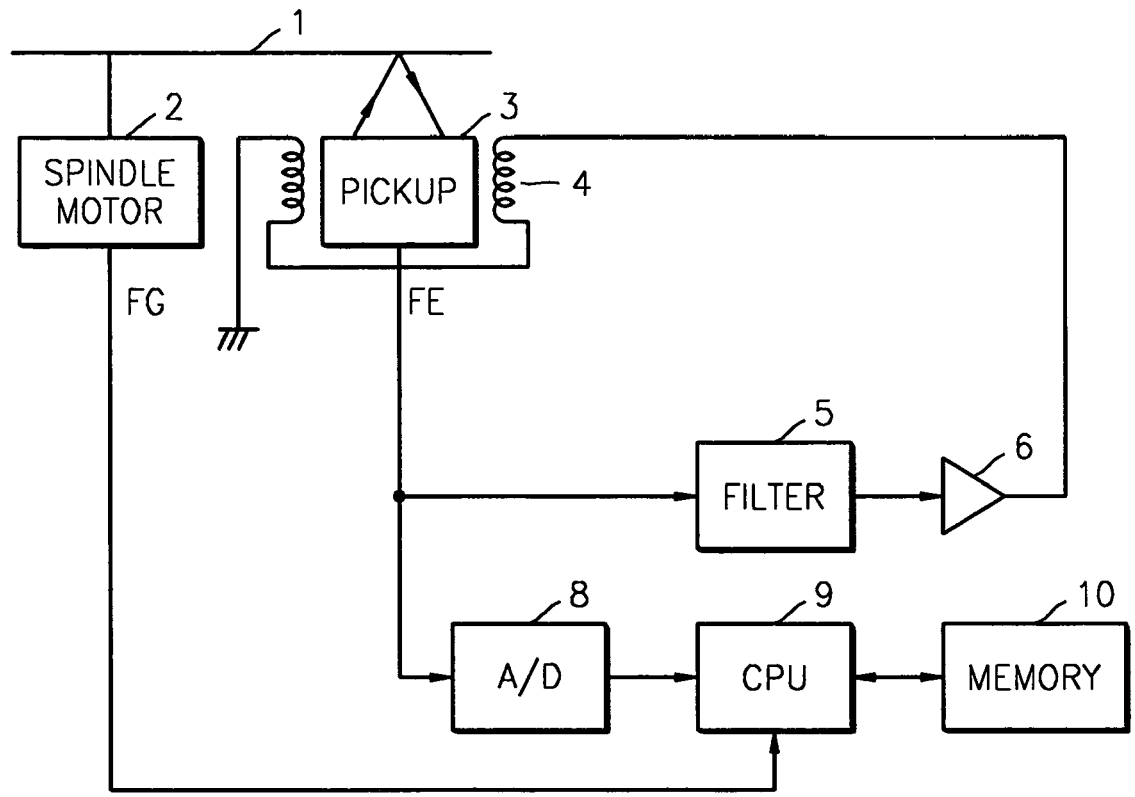
FIG. 1 is a block diagram of an optical disk drive according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an optical disk drive according to an embodiment of the present invention.

Referring to FIG. 1, an optical disk 1 is rotated by a spindle motor 2. The spindle motor 2 outputs a pulse signal FG with a 50% duty cycle to a central processing unit (CPU) 9 once per every rotation. A pickup 3 reads data from and writes data to the optical disk 1. A focus control is performed by current flowing through a coil 4. Also, the pickup 3 outputs a focus error signal FE proportional to the amount of focus deviation.

Figure 2:
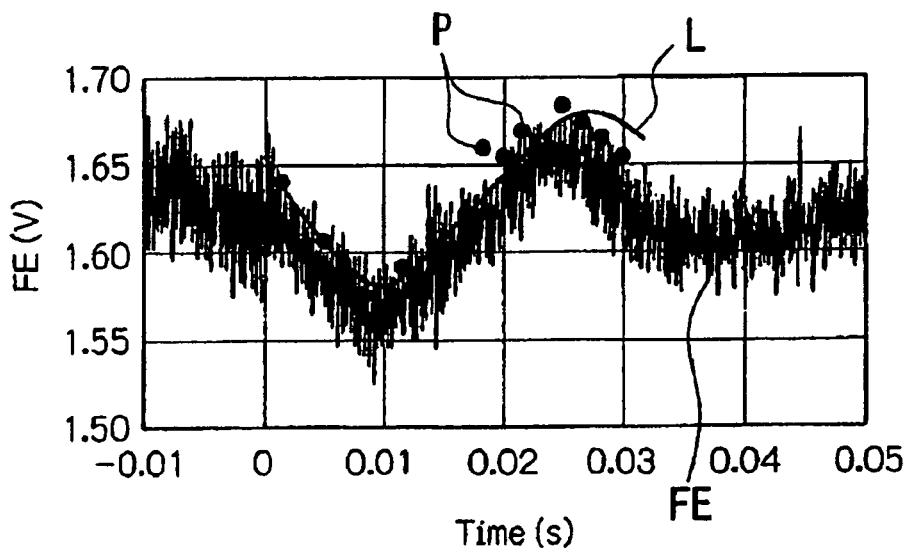
FIG. 2 is a waveform illustrating a focus error signal output from a pickup of FIG. 1.

FIG. 2 is a waveform illustrating the focus error signal FE. As shown in FIG. 2, the focus error signal FE includes a high frequency component and a low frequency component, the low frequency component being proportional to the amount of surface deviation of the optical disk 1. The focus error signal FE of FIG. 2 characterizes the optical disk 1 having a surface deviation. In the case of an optical disk with no surface deviation, a focus error signal does not exhibit a low-frequency component.

Figure 3:
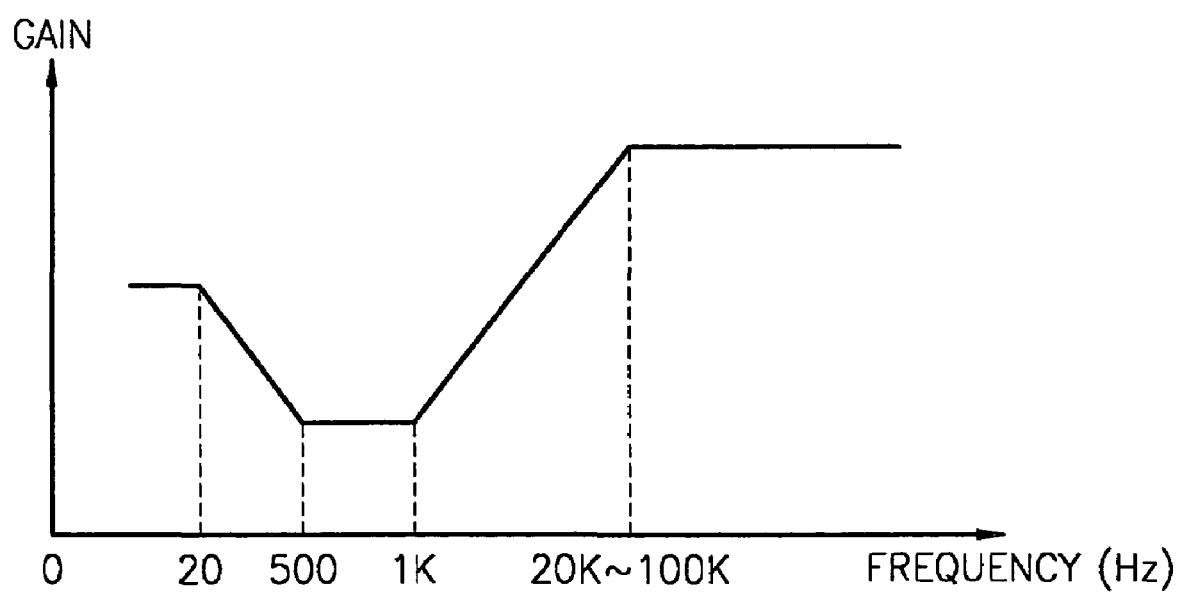
FIG. 3 is a graph showing characteristics of a filter of FIG. 1.

The focus error signal FE is input to a filter 5. FIG. 3 is a graph showing characteristics of the filter 5. As shown in FIGS. 1 and 3, the filter 5 mainly amplifies the high frequency component of the focus error signal FE by a high gain and outputs the amplified component to an amp 6. The amp 6 amplifies an output of the filter 5 and outputs the amplified output to the coil 4. An analog-to-digital converter (ADC) 8 converts the focus error signal FE into a digital signal and outputs the digital signal to the CPU 9. The CPU 9 controls every unit in the optical disk drive and detects the surface deviation of the optical disk 1 based on an output of the ADC 8. A memory 10 includes a read only memory (ROM), in which a program of the CPU 9 is memorized and a random access memory (RAM), in which data is temporarily stored.

Figure 4:
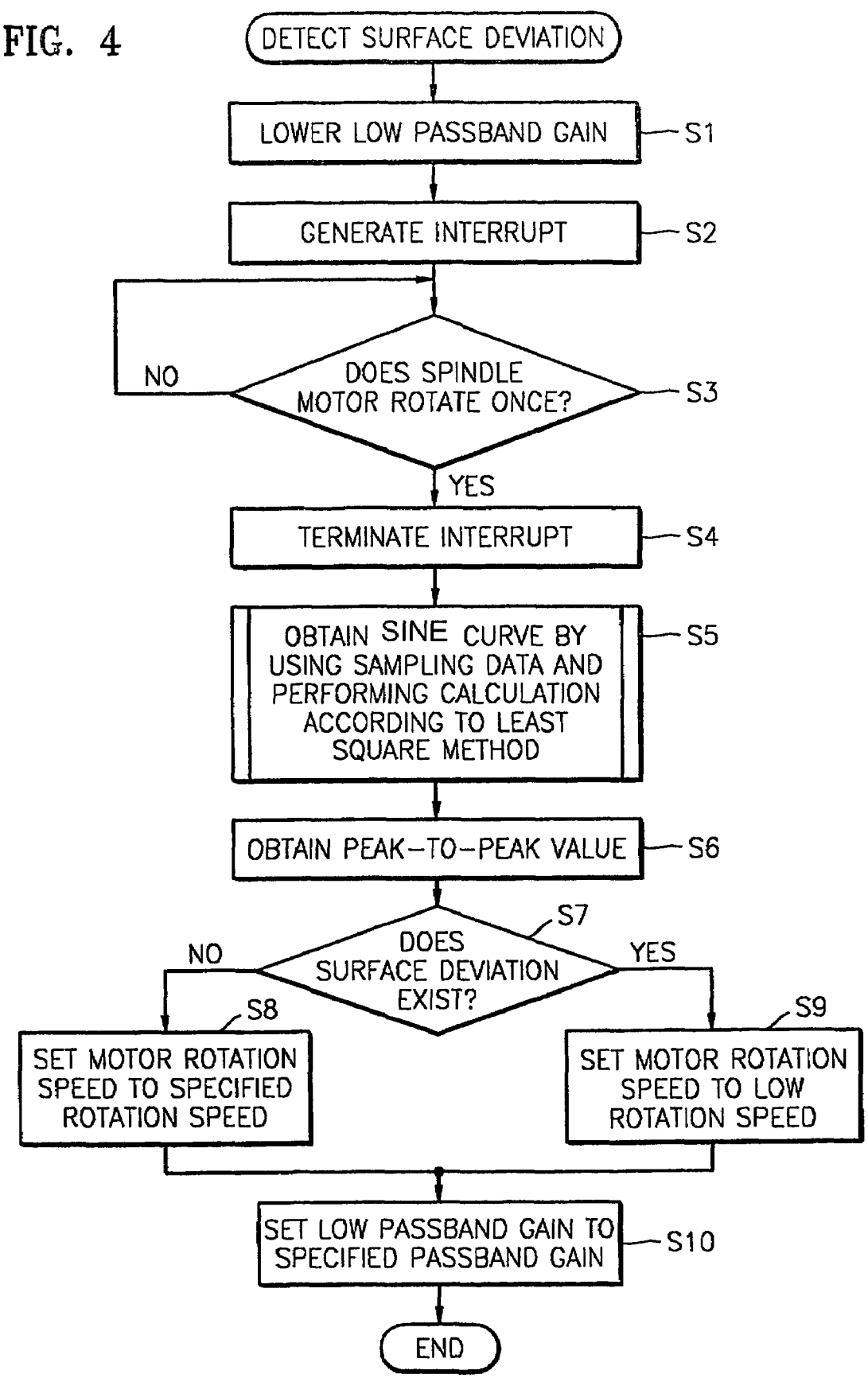
FIG. 4 is a flowchart for explaining an operation of the optical disk drive of FIG. 1.

Hereinafter, detection of the surface deviation of the optical disk drive of FIG. 1 will be described with reference to flowcharts of FIGS. 4 and 5.

In operation S1, the CPU 9 lowers a low passband gain of the filter 5. In other words, a seek error is increased by lowering a low passband gain of a focus servo signal and thus a low frequency component of the focus error signal FE, which results from the surface deviation, is amplified, which makes it easy to detect the surface deviation of the optical disk 1. In operation S2, the CPU 9 generates an interrupt at a rising edge and a falling edge of the pulse signal FG output from the spindle motor 2. In operation S3, the CPU 9 determines whether the spindle motor 2 rotates once. The CPU 9 repeats the determination until a result of the determination is 'YES'. Thus, until the result of the determination is 'YES', the spindle motor 2 rotates once and 18 interrupts are generated, as merely an example.

Figure 5:
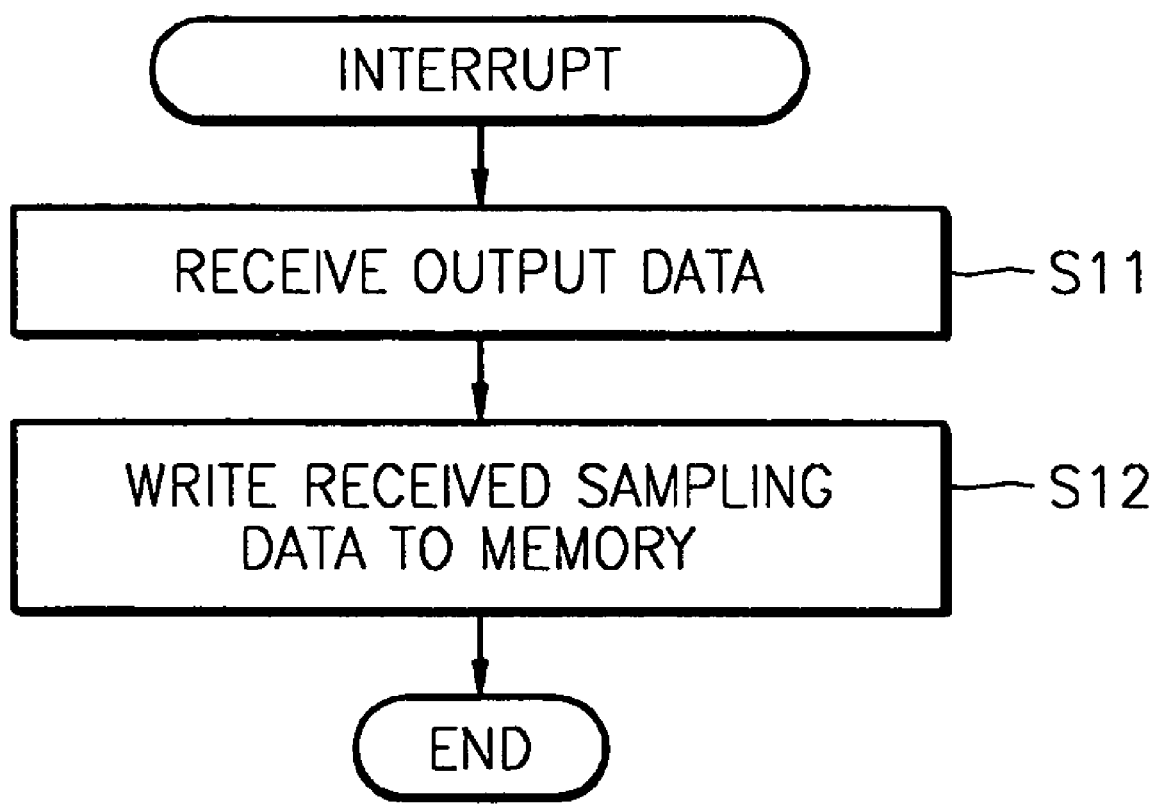
FIG. 5 is a flowchart for explaining an operation of the optical disk drive of FIG. 1.

As shown in FIG. 5, while the interrupt is being performed, the CPU 9 receives output data of the ADC 8 in operation S11 and then writes received sampling data (the output data of the ADC 8) to the memory 10 in operation S12.

The sampling data is sequentially accumulated in the memory 10 by performing operations S11 and S12 at every rising and falling edges of the pulse signal FG. Dots P shown in FIG. 2 indicate sampling dots sampled during the accumulation of the sampling data.

After the spindle motor 2 rotates once and 18 sampling data (output data of the ADC 8) are accumulated in the memory 10, the result of the determination in operation S3 becomes 'YES'. Thus, in operation S4, the interrupt is terminated. In operation S5, a sine curve approximating an imaginary line that contacts 18 sampling dots is obtained by using the 18 sampling data accumulated in the memory 10 and a least square method. In other words, a sine curve that minimizes the sum of squares of errors among 18 sampling data is obtained. A curve L of FIG. 2 indicates a sine curve that is obtained by performing the calculation according to the least square method on sampling data at every sampling dot P.

Hereinafter, the calculation according to the least square method will be described.

Approximation based on a sine curve formed by n dots, i.e., $(t1,y1), \ldots, (tn, yn)$, is considered. Since $y = \alpha \sin(\omega t + \Phi) = A \sin \omega t + B \cos \omega t$, the sum S of the squares of residuals of each sampling dot P is given by $$S = \sum_i (y - y_i)^2 \quad (1)$$

$$= \sum_i (A\sin\omega t_i + B\cos\omega t_i - y_i)^2$$

$$= A^2 \sum_i \sin^2\omega t_i + B^2 \sum_i \cos^2\omega t_i + \sum_i y_i^2 + 2AB\sum_i \sin\omega t_i \cdot \cos\omega t_i -$$

$$2A\sum_i y_i\sin\omega t_i - 2B\sum_i y_i\cos\omega t_i$$

To obtain coefficients A and B, the sum S is differentiated with respect to the coefficients A and B and the differentiation result is set to 0. In other words, the following equation is obtained.

$$\frac{\partial S}{\partial A} = 2A\sum_i \sin^2\omega t_i + 2B\sum_i \sin\omega t_i \cdot \cos\omega t_i - 2\sum_i y_i\sin\omega t_i = 0 \quad (2)$$

$$\frac{\partial S}{\partial B} = 2B\sum_i \cos^2\omega t_i + 2A\sum_i \sin\omega t_i \cdot \cos\omega t_i - 2\sum_i y_i\cos\omega t_i = 0$$

Equation 2 can be rewritten in a matrix form as follows.

$$\begin{pmatrix} \sum_i \sin^2\omega t_i & \sum_i \sin\omega t_i \cdot \cos\omega t_i \\ \sum_i \sin\omega t_i \cdot \cos\omega t_i & \sum_i \cos^2\omega t_i \end{pmatrix} \begin{pmatrix} A \\ B \end{pmatrix} = \begin{pmatrix} \sum_i y_i\sin\omega t_i \\ \sum_i y_i\cos\omega t_i \end{pmatrix} \quad (3)$$

Coefficients A and B are obtained from Equation 3. In particular, if data sampling is periodically performed, i.e., when data is obtained in synchronization with the pulse signal FG, the elements of the matrix can be simplified.

For example, if one period is divided into 18 sections by the pulse signal FG, the following equation is obtained.

$$\sum_{i=0}^{17} \sin^2\omega t_i = \sum_{i=0}^{17} \cos^2\omega t_i = 9 \quad (4)$$

$$\sum_{i=0}^{17} \sin\omega t_i \cdot \cos\omega t_i = 0$$

The coefficients A and B are given by $$A = \frac{1}{9}\sum_i y_i \sin\omega t_i \quad (5)$$

$$B = \frac{1}{9}\sum_i y_i \cos\omega t_i$$

After performing the sine approximation using the least square method, the amplitude and phase of the sine approximation are $$y = \alpha \sin(\omega t + \phi) = A\sin\omega t + B\cos\omega t \quad (6)$$

$$\alpha = \sqrt{A^2 + B^2}$$

$$\phi = \tan^{-1}\frac{B}{A}$$

After the approximation sine curve is obtained through the above processes, the CPU 9 obtains a peak-to-peak (P-P) value of the obtained sine curve, in operation S6. In operation S7, the CPU 9 determines the existence of surface deviation in the optical disk 1 by comparing the obtained P-P value to a predetermined threshold value stored in the memory 10. If the P-P value is more than the threshold value, the CPU 9 determines that the optical disk 1 has a surface deviation. If the P-P value is less than the threshold value, the CPU 9 determines that the optical disk 1 has no surface deviation. If the CPU 9 determines that the optical disk 1 has no surface deviation in operation S7 (i.e., if a result of the determination of operation S7 is 'NO'), the CPU 2 sets the rotation speed of the spindle motor 2 to a specified rotation speed in operation S8. If the CPU 9 determines that the optical disk 1 has a surface deviation in operation S7 (i.e., if the result of the determination of operation S7 is 'YES'), the CPU 9 sets the rotation speed of the spindle motor 2 to a low rotation speed in operation S9. In operation S10, the CPU 9 sets the low passband gain of the filter 5 to a specified passband gain, and the process is terminated.

The existence of the surface deviation is determined based on the focus error signal FE in this embodiment, but may be determined using an output of the amp 6, i.e., a focus actuator signal.

As described above, it is possible to determine the existence of surface deviation of a disk during a very short period, i.e., one rotation period. Thus, a time required for startup of a drive can be reduced. Also, according to the present invention, since the surface deviation can be detected with high precision by using a least square method, errors in detecting the surface deviation are prevented.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. A method of detecting a disk surface deviation, comprising:
   writing data to or reading data from a rotating optical disk;
   amplifying, via a filter, frequency components of an output of the pickup at different amplification rates according to frequencies;
   amplifying an output of the filter and outputting the amplified output to an actuator of the pickup;
   converting a focus error signal output from the pickup into digital data;
   lowering a low passband amplification rate of the filter and writing the converted digital data to a memory at a predetermined interval during one rotation of the optical disk;
   reading the written digital data and obtaining a sine curve that minimizes a sum of squares of errors among the read digital data by a least square method; and
   obtaining a peak-to-peak value of the sine curve and determining existence of surface deviation of the optical disk by comparing the obtained peak-to-peak value to a predetermined threshold value.

2. A method of detecting a disk surface deviation, comprising:
   writing data to or reading data from a rotating optical disk;
   amplifying, via a filter, frequency components of an output of the pickup at different amplification rates according to frequencies;
   amplifying an output of the filter and outputting the amplified output to an actuator of the pickup;
   converting a focus actuator signal output from the pickup into digital data;
   lowering a low passband amplification rate of the filter and writing the converted digital data to a memory at a predetermined interval during one rotation of the optical disk;
   reading the written digital data and obtaining a sine curve that minimizes a sum of squares of errors among the read digital data by a least square method; and
   obtaining a peak-to-peak value of the sine curve and determining existence of surface deviation of the optical disk by comparing the obtained peak-to-peak value to a predetermined threshold value.

3. An optical disk drive comprising:
   a pickup that writes data to or reads data from a rotating optical disk;
   a filter that amplifies frequency components of an output of the pickup at different amplification rates according to frequencies;
   an amplifier that amplifies an output of the filter and outputs the amplified output to an actuator of the pickup;
   an analog-to-digital converter which converts a focus error signal output from the pickup into digital data;
   a sampler which lowers a low passband amplification rate of the filter and writes the digital data of the analog-to-digital converter to a memory at a predetermined interval during one rotation of the optical disk;
   a calculator which reads the digital data written to the memory and obtains a sine curve that minimizes a sum of squares of errors among the read digital data by a least square method; and
   a detector which obtains a peak-to-peak value of the sine curve obtained by the calculator and determines existence of surface deviation of the optical disk by comparing the obtained peak-to-peak value to a predetermined threshold value.

4. The optical disk drive of claim 3, wherein the sampler receives the digital data of the analog-to-digital converter according to a timing of a pulse signal output from a motor rotating the optical disk each time the motor rotates by a predetermined angle.

5. An optical disk drive comprising:
   a pickup that writes data to or reads data from a rotating optical disk;

a filter that amplifies frequency components of an output of the pickup at different amplification rates according to frequencies;

an amplifier that amplifies an output of the filter and outputs the amplified output to an actuator of the pickup;

an analog-to-digital converter which converts a focus actuator signal output from the pickup into digital data;

a sampler, which lowers a low passband amplification rate of the filter and writes the digital data of the analog-to-digital converter to a memory at a predetermined interval during one rotation of the optical disk;

a calculator, which reads the digital data written to the memory and obtains a sine curve that minimizes a sum of squares of errors among the read digital data by a least square method; and a detector, which obtains a peak-to-peak value of the sine curve obtained by the calculator and determines existence of surface deviation of the optical disk by comparing the obtained peak-to-peak value to a predetermined threshold value.

6. The optical disk drive of claim 5, wherein the sampler receives the digital data of the analog-to-digital converter according to a timing of a pulse signal output from a motor rotating the optical disk each time the motor rotates by a predetermined angle.

7. A computer readable medium encoded with processing instructions for implementing a method of detecting disk surface deviation, the method comprising:

writing data to or reading data from a rotating optical disk;

amplifying, via a filter, frequency components of an output of the pickup at different amplification rates according to frequencies;

amplifying an output of the filter and outputting the amplified output to an actuator of the pickup;

converting a focus error signal output from the pickup into digital data;

lowering a low passband amplification rate of the filter and writing the converted digital data to a memory at a predetermined interval during one rotation of the optical disk;

reading the written digital data and obtaining a sine curve that minimizes a sum of squares of errors among the read digital data by a least square method; and obtaining a peak-to-peak value of the sine curve and determining existence of surface deviation of the optical disk by comparing the obtained peak-to-peak value to a predetermined threshold value.

8. A computer readable medium encoded with processing instructions for implementing a method of detecting disk surface deviation, the method comprising:

writing data to or reading data from a rotating optical disk;

amplifying, via a filter, frequency components of an output of the pickup at different amplification rates according to frequencies;

amplifying an output of the filter and outputting the amplified output to an actuator of the pickup;

converting a focus actuator signal output from the pickup into digital data;

lowering a low passband amplification rate of the filter and writing the converted digital data to a memory at a predetermined interval during one rotation of the optical disk;

reading the written digital data and obtaining a sine curve that minimizes a sum of squares of errors among the read digital data by a least square method; and obtaining a peak-to-peak value of the sine curve and determining existence of surface deviation of the optical disk by comparing the obtained peak-to-peak value to a predetermined threshold value.

* * * * *